(12) United States Patent
Ur

(10) Patent No.: US 9,373,145 B2
(45) Date of Patent: Jun. 21, 2016

(54) SOCIAL NETWORK REPORTS

(75) Inventor: Shmuel Ur, Galil (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 28 days.

(21) Appl. No.: 13/502,088

(22) PCT Filed: Oct. 17, 2011

(86) PCT No.: PCT/US2011/056598
§ 371 (c)(1),
(2), (4) Date: Apr. 13, 2012

(87) PCT Pub. No.: WO2013/058731
PCT Pub. Date: Apr. 25, 2013

(65) Prior Publication Data
US 2013/0097241 A1 Apr. 18, 2013

(51) Int. Cl.
*G06Q 50/00* (2012.01)
*G06Q 50/10* (2012.01)
*G06Q 10/10* (2012.01)

(52) U.S. Cl.
CPC ............... *G06Q 50/01* (2013.01); *G06Q 10/10* (2013.01)

(58) Field of Classification Search
CPC ............................. G06Q 50/02; G06Q 10/10
USPC ........................................................ 709/204
See application file for complete search history.

(56) References Cited

U.S. PATENT DOCUMENTS

| 7,886,000 | B1 * | 2/2011 | Polis et al. ................... 709/203 |
| 8,549,073 | B2 * | 10/2013 | Dale et al. ................... 709/204 |
| 2005/0149759 | A1 | 7/2005 | Vishwanath et al. |
| 2008/0161944 | A1 * | 7/2008 | Lutnick .......................... 700/90 |
| 2010/0088372 | A1 | 4/2010 | Shridhar et al. |
| 2011/0208771 | A1 * | 8/2011 | Milou et al. .................. 707/769 |
| 2012/0180135 | A1 * | 7/2012 | Hodges et al. ................. 726/26 |
| 2013/0124504 | A1 * | 5/2013 | Haugen et al. ............... 707/722 |
| 2013/0290430 | A1 * | 10/2013 | Yung et al. ................... 709/204 |
| 2013/0290433 | A1 * | 10/2013 | Park ............................. 709/204 |

FOREIGN PATENT DOCUMENTS

| CN | 102172007 A | 8/2011 |
| JP | 2009146315 A | 7/2009 |
| JP | 2011076478 A | 4/2011 |
| WO | WO 2009023983 A1 * | 2/2009 |

OTHER PUBLICATIONS

YoName (YoName.com, Aug. 7, 2007, 1 page).*
Salvatore et al. (Crawling Facebook for Social Network Analysis Purposes, May 27, 2011, ACM, 8 Pages.*
(Continued)

*Primary Examiner* — Kevin Bates
*Assistant Examiner* — Jeyanath Jeyaratnam
(74) *Attorney, Agent, or Firm* — Brundidge & Stanger, P.C.

(57) ABSTRACT

Technology is disclosed for generating social networking reports. In various embodiments, the technology receives an identity of a user wherein the identity is associated with a first online social network and does not include a password; collects first information about the user from the first online social network; generates a first report based on the collected first information; and transmits the generated first report.

18 Claims, 6 Drawing Sheets

(56) References Cited

OTHER PUBLICATIONS

Marie et al. (IMGT, the international ImMunoGeneTics database, Nucleic Acids Research, 1999, vol. 27, No. 1, 4 Pages).*
URLBlacklist (http://urlblacklist.com/?sec=dow nload, Dec. 30, 2009, 1 Page).*
Bilge et al. (All Your contacts are belong to US: Automated Identity theft attacks on social networks, Apr. 2009, 10 Pages).*
"Help Net Security," Remote monitoring tool for social networking activity, © 1998-2012 by Help Net Security, http://www.net-security.org/secworld.php?id=9692 , 2 pages, last accessed Apr. 17, 2012.
"Norton Online Family," parental control software, © 1995-2012 Symantec Corporation, https://onlinefamily.norton.com/familysafety/loginStart.fs , 1 pages, last accessed Apr. 17, 2012.
"Safe Eyes," parental control software from McAfee, © 2009 InternetSafety.com, http://www.internetsafety.com/safe-eyes-parental-control-software.php , 3 pages, last accessed Apr. 17, 2012.
"SafeSocial," How AOL SafeSocial Works, © 2012 AOL Inc., http://www.safesocial.com/how-it-works/ , 2 pages, last accessed Apr. 17, 2012.
"Social Spy—Social Network Spy," © Social Network Spy 2009-2012, http://www.socialglance.com/ , 1 page, last accessed Apr. 17, 2012.
"SocialShield," How SocialShield Works, © 2012 SocialShield, http://www.socialshield.com/company/how-it-works , 1 page, last accessed Apr. 17, 2012.
"Spyware," Wikipedia, the free encyclopedia, http://en.wikipedia.org/wiki/Spyware , 20 pages, last accessed Apr. 17, 2012.
"SurveilStar," Monitoring Kids' Social Networking with Social Networking Spy Software, © 2011 SurveilStar Inc., http://www.any-parental-control.com/social-network-monitoring-software.html , 2 pages, last accessed Apr. 17, 2012.
"The Crimson Hexagon ForSight Platform," © 2007-2011 Crimson Hexagon, Inc., http://www.crimsonhexagon.com/science/platform-overview/ , 2 pages, last accessed Apr. 17, 2012.
Chen, Brian X., "iPhone Tracks Your Every Move, and There's a Map for That," Apr. 20, 2011, Gadget Lab, Wired.com, http://www.wired.com/gadgetlab/2011/04/iphone-tracks/ , 4 pages, last accessed Apr. 17, 2012.
Karthik, Mani, "10 Social Media Monitoring Tools for Measuring Social Media Analytics," DailyBloggr.com, Published on Mar. 30, 2010, http://www.dailybloggr.com/2010/03/social-media-monitoring-tools-analytics/ , 28 pages, last accessed Apr. 17, 2012.
Lee, Adriana, "Apple accused of letting apps sell user info," Dec. 30, 2010, TIP—Today's iPhone, http://www.todaysiphone.com/2010/12/apple-accused-of-letting-apps-sell-user-info/ , 2 pages, last accessed Apr. 17, 2012.
PCT International Search Report for Application No. PCT/US11/56598 mailed Mar. 13, 2012, 2 pages.
Kirkpatrick, M., "The Future of Social Media Monitoring," accessed at http://web.archive.org/web/20110926033614/http://www.readwriteweb.com/archives/whats_next_in_social_media_monitoring.php, published on Apr. 15, 2009, pp. 1-3.

* cited by examiner

SOCIAL NETWORK REPORTS

CROSS-REFERENCE TO RELATED APPLICATIONS

This application is a U.S. National Stage filing under 35 U.S.C. §371 of PCT Application Ser. No. PCT/US2011/056598, filed on Oct. 17, 2011, entitled "SOCIAL NETWORK REPORTS," which is incorporated herein by reference in its entirety.

BACKGROUND

Many people use social networking sites to stay in touch with their friends, relatives, acquaintances, and others. An online social networking site (or simply a social networking site) is typically a server-based application, e.g., an Internet website. Users may connect to the social networking site using a client application, e.g., using an Internet browser, or other client application. Users may use the social networking sites via a client computing device, e.g., a mobile client computing device. Examples of client computing devices are personal computers, laptop computers, tablet computers, "smart phones," etc. Examples of online social networking sites are Facebook®, Twitter®, etc.

Users may use social networking sites to post "updates," personal information, business information, etc. Users may designate that the posted information is to be shared with a selected group of users. As an example, a user may indicate that personal information is to be shared only with friends, business information is to be shared only with business associates, and other information can be shared publicly. However, not all social networking websites provide features to accurately designate information to be shared. Moreover, users may share information using multiple social networking sites. In many cases, information posted to one social networking site may automatically also be posted to other social networking sites. As a result, users may inadvertently share information with people they did not intend to share the information with.

Information that users share on social networking sites are now used in ways that the users did not intend. As an example, prospective employers, educators, and others are able to view information that users have shared on social networking sites when such information is publicly available. Alternatively, information that a user intended to share with one group may accidentally be shared with a different group with which the user may not have intended to share the information—or even from whom the user may have even intended to hide the information. To determine which information has been shared with which groups of users, users may take various approaches.

A first approach is to ask other users, e.g., "friends" or other users belonging to specific identified groups, to log into the social networking site(s) and review what information is available to them from the user who shared the information. Another approach is to use various online reports that collect information from the various social networking sites. Such report generating websites typically require the user's login information so that the tools can log into the relevant social networking sites and retrieve the published information. However, users are often reticent to share their login information, e.g., especially with unknown or untrusted report generating tools.

DETAILED DESCRIPTION

Figure 1:
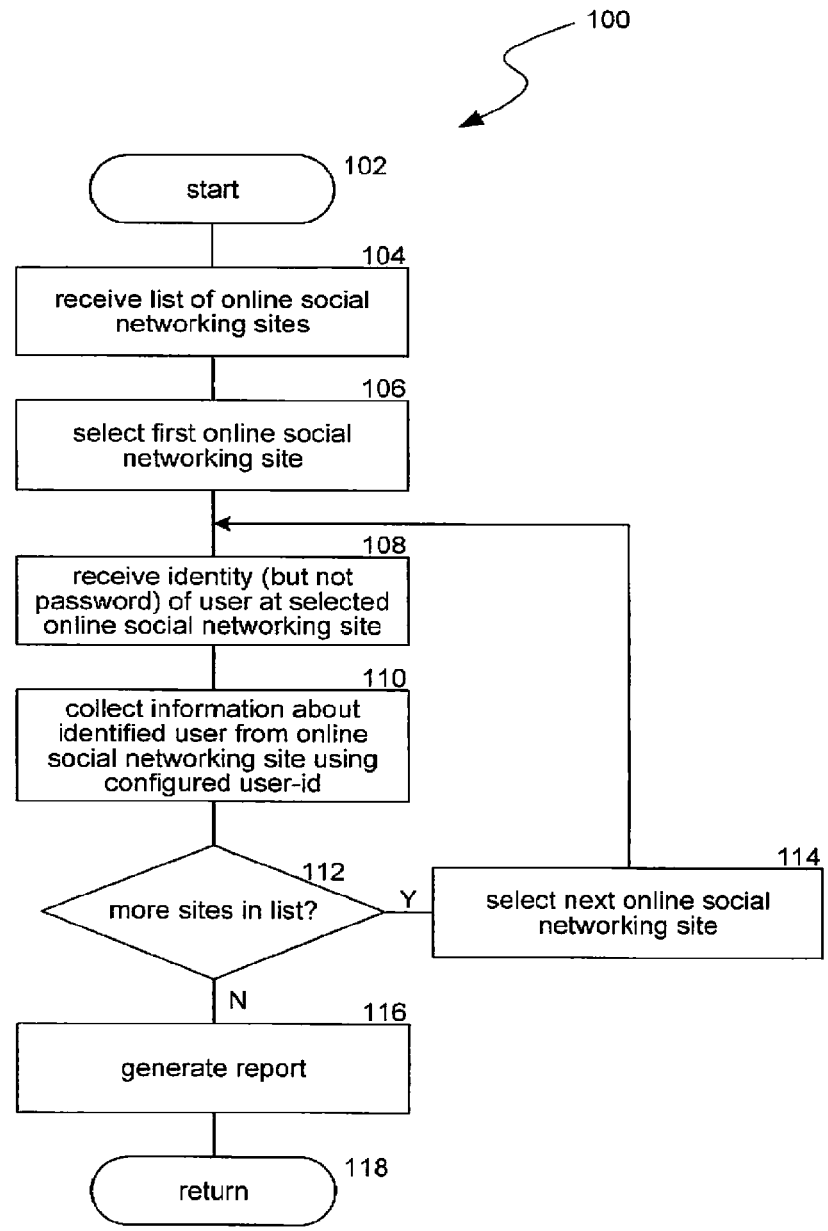
FIG. 1 is a flow diagram illustrating a routine the technology may invoke in various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is described for identifying shared social networking information ("the technology"). In various embodiments, the technology receives a list of online social networking sites, an identity of a user at one or more of the social networking sites but not the user's password at these social networking sites, collects information relevant to the identified user from one or more of the social networking sites, and generates a report. The technology may have previously designated user identifying information that the technology can employ to log into one or more of the social networking sites. In these cases, the user does not need to provide a user identifier ("ID") to the technology. However, the user may need to add the user ID the technology employs to the pertinent groups at the social networking sites that the user is interested in determining what posted social networking information is available and to whom. The technology may have several user identifiers for a particular social networking site. The user may designate one of the user identifiers as a "friend," a second user identifier as a "business acquaintance," and so forth. The technology may then collect information relevant to the user by logging into the social networking site using each of the user identifiers and generate a report based on the collected information. The generated report may then specify that friends can see a first set of posted information, business acquaintances can see a second set of posted information, and so forth. By merely identifying user identifiers and not passwords, the technology enables users to generate pertinent reports without providing passwords.

In various embodiments, the technology receives an identity of a user wherein the identity is associated with a first online social network and does not include a password; collects first information about the user from the first online social network; generates a first report based on the collected first information; and transmits the generated first report. In various embodiments, one or more service accounts are created or designated according to the possible number of social groups (or subgroups) that a user may have in the first online social network. More particularly, for example, a service account can be an account other than the user's account to be analyzed in the first online social network. The technology can select a service account that is associated with the first online social network and employ the selected service account to log into the first online social network. The selected service account can be a member of a user group that the user has previously identified. The technology can receive an identity of a user wherein the identity is associated with a second online social network and does not include a password; collect second information about the user from the second online social network; generate a second report based on the collected first and second information; and transmit the generated second report. An account previously added by the user to a social network group can be employed to collect the first information.

In various embodiments, the technology can transmit a request to collect online social network information from at least one online social network without providing a password; and receive a report including the social network information. The request can be transmitted to a service operated at a server. The technology can add an account of the service to the online social network without providing privileges for the account. The request can include an identification of an online social network group and the received report includes information available to the online social network group but not to a different online social network group.

In various embodiments, the technology can include a processor and memory; a social network collection tool configured to collect information relating to a user from one or more online social network services; and a component configured to receive a request from a Web browser wherein the Web browser is not configured with an add-in for any of the one or more online social network services and produce a report in response to the received request. In various embodiments, no server component affiliated with either the network collection tool or the component configured to receive the request employs a password on behalf of the user to collect the information from the one or more online social network services. The social network collection tool can employ an account that the user has added to an online social network group, and the produced report can include information available to other members of the online social network group. The technology may employ a component that produces the report. The request can include an indication of an online social network group and the produced report can include information available to other members of the online social network group.

Turning now to the figures, FIG. 1 is a flow diagram illustrating a routine 100 the technology may invoke in various embodiments, e.g., to generate a report. The routine 100 begins at block 102. The routine 100 then continues at block 104, where it receives a list of online social networking sites. As an example, the list of online social networking sites may be specified using uniform resource locators ("URLs"). The routine 100 then continues at block 106, where it selects a first online social networking site from the received list. The routine 100 then continues at block 108, where it receives an identity of a user, but not the user's password, that the user uses to log in one or more of the listed social networking sites. The routine 100 then continues at block 110, where it collects information posted to the social networking site about the identified user. More specifically, for example, the technology may ask the user how many groups (or subgroups) he or she wants to analyze in the selected social networking sites. If, for example, the user wants to know what information is accessible to other users in either or both of the "friend" group and the "business associate" group, the user can identify these two groups to the routine 100. Then, the technology may employ one or more user identifiers with which the technology is configured to log into the social networking site. As an example, the routine 100 may use a first user identifier that is designated as a friend of the identified user, a second user identifier configured as a business associate of the identified user, etc. The routine 100 then continues at decision block 112, where it determines whether there are more sites in the list of online social networking sites from which information has not yet been collected. If that is the case, the routine 100 continues at block 114. Otherwise, the routine 100 continues at block 116. At block 114, the routine 100 selects a next online social networking site from the received list of social networking sites. The routine 100 then continues at block 108. At block 116, the routine 100 generates a report. As an example, the routine may generate a report that provides information collected relating to the identified user from one or more of the listed social networking sites. The reported information may be grouped by user identifiers (or groups associated therewith) that the technology used to collected information. As an example, a first grouping may be friends, a second grouping may be business associates, and so forth. The routine 100 then continues at block 118, where it returns.

Those skilled in the art will appreciate that the logic illustrated in FIG. 1 and described above, and in each of the flow diagrams discussed below, may be altered in a variety of ways. For example, the order of the logic may be rearranged, substeps may be performed in parallel, illustrated logic may be omitted, other logic may be included, etc.

Figure 2:
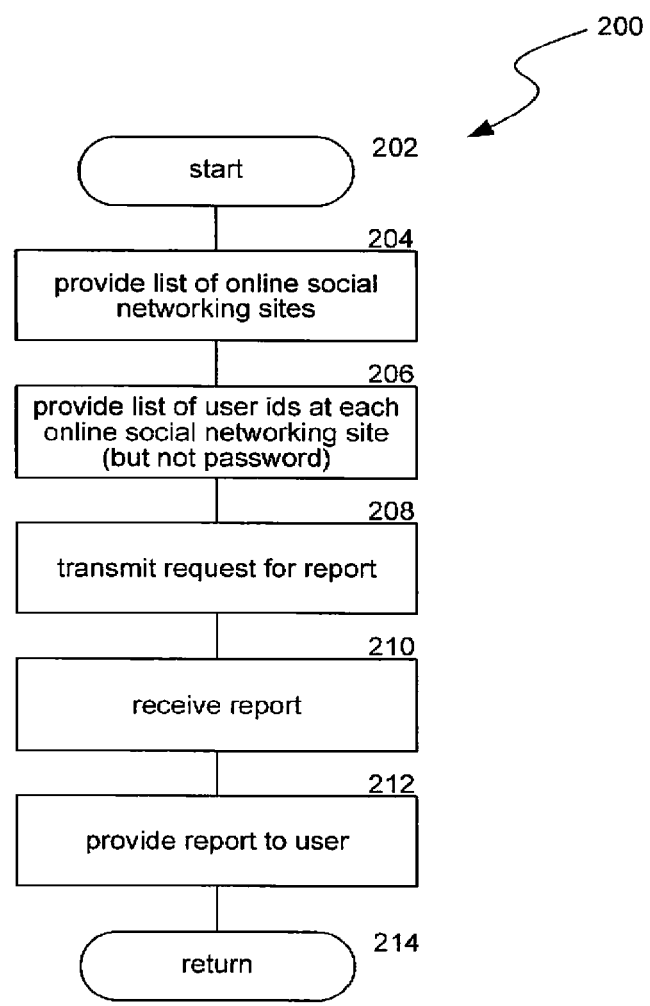
FIG. 2 is a flow diagram illustrating a routine invoked by the technology in various embodiments.

FIG. 2 is a flow diagram illustrating a routine 200 invoked by the technology in various embodiments, e.g., to request and receive reports. The routine 200 begins at block 202. The routine 200 then continues at block 204, where it provides a list of online social networking sites, e.g., to a server computing device. The routine 200 then continues at block 206, where it provides a list of user identifiers for a user requesting a report at each of the identified online social networking sites, but not a password for at least one of the user identifiers. In some embodiments, the routine 200 does not provide a password for any of the identified social networking sites. The routine 200 then continues at block 208, where it transmits a request for a report, e.g., to the server computing device. The routine 200 then continues at block 210, where it receives a report. In various embodiments, the server computing device may have invoked the routine 100 described above in relation to FIG. 1 to generate the report that was received at block 210. The routine 200 then continues at block 212, where it may provide the report to the user. As an example, the routine 200 may provide the report as a form as a web page, an attachment in an email that is sent to the user, etc. The routine 200 then returns at block 214.

Figure 3:
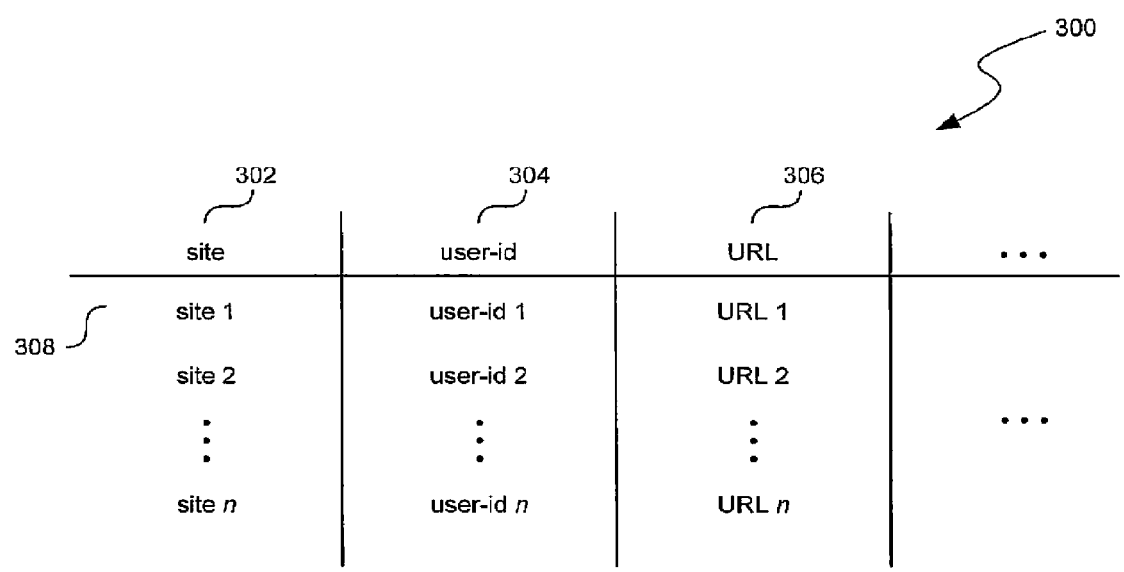
FIG. 3 is a table diagram illustrating a table that the technology may employ in various embodiments.

FIG. 3 is a table diagram illustrating a table 300 that the technology may employ in various embodiments, e.g., to store a list of online social networking sites, a list of user identifiers corresponding to one or more of the online social networking sites, and a list of uniform resource locators corresponding to each of the social networking sites. The table 300 can include a column 302 listing one or more online social networking sites, a column 304 listing user identifiers for one or more of the online social networking sites listed in column 302, and a column 306 listing URLs corresponding to one or more of the online social networking sites listed in column 302. The table 300 may include one or more rows 308 for the online social networking sites listed in column 302. In various embodiments, the table 300 may be stored at a client computer device, a server computing device, or both computing devices. In various embodiments, the table 300 may initially be populated by a user using a computing device and then may be transmitted to a server computer device that generates a report.

While FIG. 3 shows a table whose contents and organization are designed to make it more comprehensive by a human reader, those skilled in the art will appreciate that actual data structures used by the facility to store this information may differ from the table shown, in that it, for example, may be organized in a different manner; may contain more or less information than shown; may be compressed and/or encrypted; etc.

Figure 4:
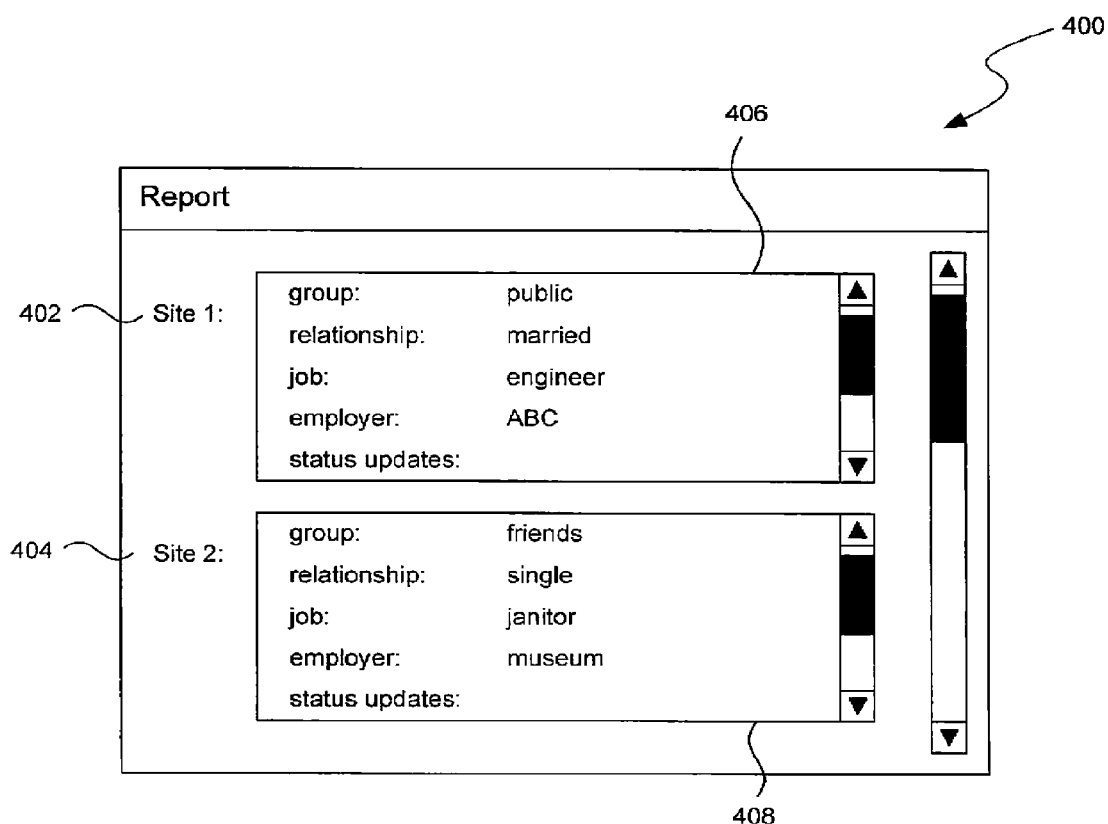
FIG. 4 is a user interface diagram illustrating a user interface that the technology may employ in various embodiments.

FIG. 4 is a user interface diagram illustrating a user interface 400 that the technology may employ in various embodiments, e.g., to provide a report to a user. The user interface 400 can identify online social networking sites, e.g., online social networking sites 402 and 404 in the report. Each identified online social networking site may have a corresponding region listing information available to groups associated with user identifiers used by the technology to retrieve online social networking activity from each of the sites. As an example, a region 406 lists online social networking site information available to members of the public who view such information at online social networking site 402. Region 408 lists online social networking site information available to individuals who are in the user's "friends" group at online social networking site 404. Information from additional groups can be made visible, e.g., by scrolling.

Social networking sites may have different user interfaces, group settings, privacy/sharing settings, etc. In some cases, users may configure a social networking site to automatically post information on a different social networking site. These differences and configurations can make managing it difficult for users to manage posted information—especially for users who have accounts at different social networking sites. By providing a user interface, e.g., as illustrated in FIG. 4 and described herein, the technology enables users to monitor and manage their online social networking activity.

Figure 5:
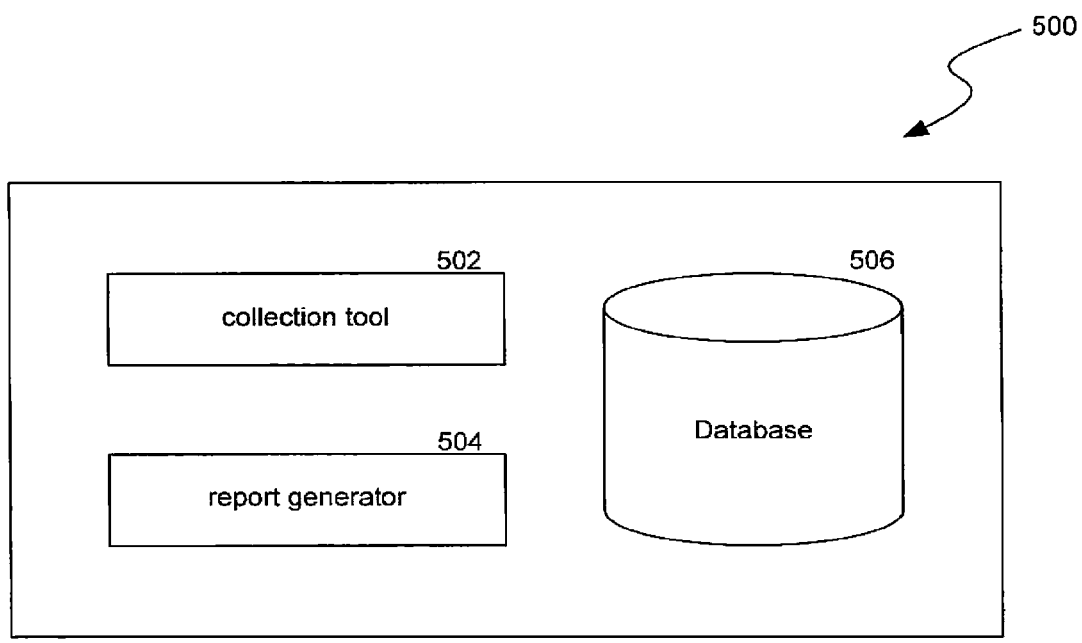
FIG. 5 is a flow diagram illustrating components that the technology may employ in various embodiments.

FIG. 5 is a block diagram illustrating components 500 that the technology may employ in various embodiments. The components 500 can include a collection tool 502, a report generator 504, and a database 506. The technology may also employ other components (not illustrated). The collection tool 502 can collect information from various online social networking sites. As an example, the technology may employ the collection tool 502 to retrieve a list of online social networking sites from the database 506 and from each of the listed online social networking sites. The collection tool 502 can collect information that the user has posted, or others have posted, e.g., status updates, photographs, metadata associated with photographs or video, etc. The collection tool 502 may employ user identifiers associated with the online social networking site and stored in database 506 to log into the online social networking site. The collection tool may then store the collected information at the database 506 or a different database (not illustrated). The report generator 504 may then generate reports, e.g., reports to be sent via email, displayed at a web page, etc., using the information that the collection tool 502 stored in the database 506.

Figure 6:
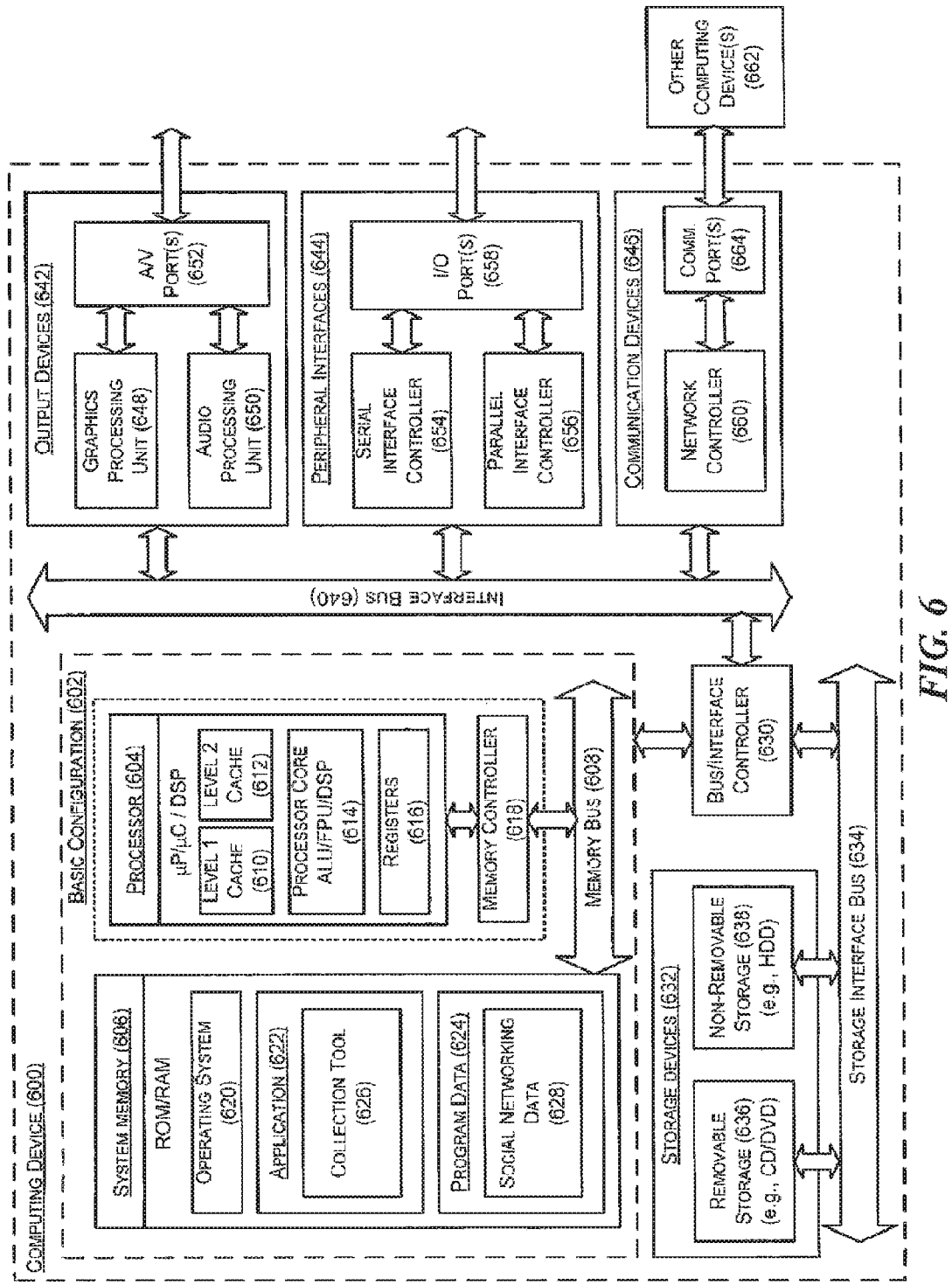
FIG. 6 is a block diagram of an illustrative embodiment of a computing device that is arranged in accordance with at least some embodiments of the present disclosure.

FIG. 6 is a block diagram illustrating an example computing device 600 that is arranged in accordance with at least some embodiments of the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a micropro-cessor ("μP"), a microcontroller ("μC"), a digital signal processor ("DSP"), or any combination thereof. Processor 604 may include one more levels of caching, such as a level one cache 610 and a level two cache 612, a processor core 614, and registers 616. An example processor core 614 may include an arithmetic logic unit ("ALU"), a floating point unit ("FPU"), a digital signal processing core ("DSP Core"), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a collection tool 626 that is arranged to collect social networking data. Program data 624 may include social networking data 628, as is described herein. In some embodiments, application 622 may be arranged to operate with program data 624 on operating system 620 such that printing can occur across a fold if a folded page without loss of image quality. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives ("HDD"), optical disk drives such as compact disk ("CD") drives or digital versatile disk ("DVD") drives, solid state drives ("SSD"), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency ("RF"), microwave, infrared ("IR") and other wireless media. The term computer readable media as used herein may include both storage media and communication media.

Computing device 600 may be implemented as a portion of a small-form factor portable (or mobile) electronic device such as a cell phone, a personal data assistant ("PDA"), a personal media player device, a wireless web-watch device, a personal headset device, an application specific device, or a hybrid device that include any of the above functions. Computing device 600 may also be implemented as a personal computer including both laptop computer and non-laptop computer configurations.

It should be noted that the term "password" mentioned above is not limited to a combination of numbers, characters, symbols or the like. The term "password" can include any biological feature that may be used to authenticate users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing device having a processor and memory, comprising:
    receiving, by the processor, an identity of a user,
        wherein the identity is associated with a user account of a first online social network and does not include a password, and
        wherein the identity is a user name specified by the user;
    receiving a request to collect the user's information that is accessible to other members of one or more of the user's network groups in the first online social network,
        wherein each of the one or more of the user's network groups is designated as a friend group or a business associate group;
    collecting first information from the requested user's information,
        wherein the first information about the user is accessible to a first service account, and
        wherein accessibility of the information accessible to the first service account is determined based on a relationship between the user account and the first service account, and the relationship is established by adding the first service account to the one or more of the user's network groups in the first online social network;
    generating a first report based on the collected first information by:
        associating the collected first information with the friend group or the business associate group based on the user's designation, and
        indicating the collected information, relating to the user, that is available to the other members in the friend group or the business group in the first online social network; and
    providing the generated first report.

2. The method of claim 1, further comprising selecting a service account that is associated with the first online social network and employing the selected service account to log into the first online social network.

3. The method of claim 2, wherein the selected service account is a member of a user group that the user has previously identified.

4. The method of claim 2, further comprising:
    receiving, by the processor, an identity of the user wherein the identity is associated with a second online social network and does not include a password;
    collecting second information about the user from the second online social network,
        wherein the second information includes information accessible to a second service account, and
        wherein the accessibility of the information accessible to the second service account is determined based on a relationship between the user account and the second service account, and the relationship is established by adding the second service account to a second social network group that the user has in the second online social network;
    generating a second report based on the collected first and second information; and
    providing the generated second report.

5. The method of claim 1, further comprising:
    employing an account previously added by the user to a social network group to collect the first information.

6. A non-transitory computer-readable storage device storing computer-executable instructions, the instructions comprising:
    transmitting a request to collect online social network information, about a user, that is accessible to other members of one or more of the user's network groups from at least one online social network based on an identity without providing a password,
        wherein each of the one or more of the user's network groups is designated as a friend group or a business associate group, and
        wherein the identity is a user name specified by the user; and
    receiving a report including the collected social network information from the requested information about the user,
        wherein the social network information is accessible to a first service account,
        wherein accessibility of the information accessible to the first service account is determined based on a relationship between the user and the first service account, and the relationship is established by adding the first service account to the one or more of the user's network groups in the at least one online social network, and wherein the received report includes an indication of information, relating to the user, that is available to the other members of the friend group or the business associate group in the at least one online social network.

7. The computer-readable storage device of claim 6, wherein the request is transmitted to a service operated at a server.

8. The computer-readable storage device of claim 7, further comprising adding an account of the service to the online social network without providing privileges for the account.

9. The computer-readable storage device of claim 8, wherein the request includes an identification of an online social network group and the received report includes information available to the online social network group but not to a different online social network group.

10. The computer-readable storage device of claim 9, further comprising employing a user identifier to log into the online social network,
    wherein the user identifier has previously been added by the user about whom the report is generated to the online social network group but not to the different online social network group.

11. A system, comprising:
    a processor and memory;
    a social network collection tool configured to:
        receive a request to collect a user's information that is accessible to other members of one or more of the user's network groups in at least one or more online social network services,
    wherein each of the one or more of the user's network groups is designated as a friend group or a business associate group, and
    collect information relating to the user from the requested user's information based on an identity without a password for authenticating the user,
    wherein the identity is a user name specified by the user,
    wherein the collected information, about the user, is accessible to a first service account, and
    wherein accessibility of the information accessible to the first service account is determined based on a relationship between the user and the first service account, and the relationship is established by adding the first service account to the one or more of the user's network groups in the at least one or more online social network services; and
    a component configured to receive a request to produce a report from a Web browser,
    wherein the Web browser is not configured with an add-in for any of the one or more online social network services, and
    wherein the component is further configured to produce the report in response to the received request by:
        associating the collected information with the friend group or the business associate group based on the user's designation, and
        indicating the collected information, relating to the user, that is available to the other members of the friend group or the business associate group in the at least one or more online social network services.

12. The system of claim 11, wherein no server component affiliated with either the social network collection tool or the component configured to receive the request employs a password on behalf of the user to collect the information from the one or more online social network services.

13. The system of claim 11, wherein the request includes an indication of an online social network group and the produced report includes information available to other members of the online social network group.

14. The system of claim 11, further comprising a database for storing identifiers associated with the user at the one or more online social network services.

15. The system of claim 14, wherein the database identifies a uniform resource locator for at least one of the one or more online social network services.

16. The system of claim 14, wherein the database includes at least one row for at least one of the one or more online social network services.

17. The system of claim 14, wherein the database does not include a password for at least one of the one or more online social network services.

18. The system of claim 17, wherein the database does not include passwords for any of the one or more online social network services.

* * * * *